(12) United States Patent
Nakagawa et al.

(10) Patent No.: US 7,303,360 B2
(45) Date of Patent: Dec. 4, 2007

(54) UNDERWATER INSPECTING AND REPAIRING SYSTEM

(75) Inventors: Tetsuro Nakagawa, Yokohama (JP); Yasuhiro Yuguchi, Yokohama (JP); Koichi Soma, Yokohama (JP); Hiroshi Iimori, Chigasaki (JP); Mitsuaki Shimamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/674,225

(22) Filed: Feb. 13, 2007

(65) Prior Publication Data

US 2007/0189858 A1 Aug. 16, 2007

(30) Foreign Application Priority Data

Feb. 13, 2006 (JP) .............................. 2006-035209

(51) Int. Cl.
*B63C 11/10* (2006.01)

(52) U.S. Cl. ...................... 405/190; 405/191; 114/222; 15/1.7

(58) Field of Classification Search ................ 405/190, 405/191; 114/222; 15/1.7
See application file for complete search history.

(56) References Cited

U.S. PATENT DOCUMENTS

| | | | | |
|---|---|---|---|---|
| 3,906,572 A | * | 9/1975 | Winn | ............................ 15/1.7 |
| 4,697,536 A | * | 10/1987 | Hirata | ........................ 114/222 |
| 4,890,567 A | * | 1/1990 | Caduff | ......................... 114/222 |
| 5,048,445 A | * | 9/1991 | Lever et al. | ................. 114/222 |
| 5,174,222 A | * | 12/1992 | Rogers | ......................... 114/222 |
| 5,513,930 A | * | 5/1996 | Eathorne | .................... 114/222 |
| 5,536,199 A | * | 7/1996 | Urakami | ....................... 451/91 |
| 5,730,553 A | | 3/1998 | Miura et al. | |
| 5,852,984 A | * | 12/1998 | Matsuyama et al. | ........ 114/222 |
| 2007/0140403 A1 | * | 6/2007 | Yuguchi e al. | .............. 376/249 |

FOREIGN PATENT DOCUMENTS

| | | |
|---|---|---|
| JP | 9-058586 A | 3/1997 |
| JP | 2003-040194 A | 2/2003 |
| JP | 2005-030773 A | 2/2005 |
| JP | 2005-106655 A | 4/2005 |

\* cited by examiner

*Primary Examiner*—Frederick L. Lagman
(74) *Attorney, Agent, or Firm*—Foley & Lardner LLP

(57) ABSTRACT

Disclosed is a system that performs inspection and repair of an underwater structure, specifically core internals in a pressure vessel. An underwater vehicle is provided with a drive wheel, a contact force generating unit (e.g., thruster) that presses the drive wheel to a vertical wall of the underwater structure, an ascending force control unit (e.g., ballast) that controls the buoyancy of the vehicle, a guide roller that engages with and is pressed against an undersurface of the underwater structure by the ascending force controlled by the ascending force control unit. The underwater vehicle is appropriately positioned with respect to the vertical direction by the guide roller. The drive wheel is driven for rotation so that the underwater vehicle runs horizontally along the vertical wall to reach the inspection or repair site, where the inspection or repair is carried out by work tool mounted to the underwater vehicle.

14 Claims, 9 Drawing Sheets

(a)        (b)

UNDERWATER INSPECTING AND REPAIRING SYSTEM

BACKGROUND OF THE INVENTION

1. Field of the Invention

The present invention relates to a system that moves in water filling up a hollow structure such as a nuclear reactor and performs inspection or repair of a member disposed in the water.

2. Description of the Related Art

Core internals, or structures in a pressure vessel, of a nuclear reactor, specifically a boiling-water reactor (BWR), are made of a material enduring high-temperature and high-pressure conditions and having high-temperature strength, such as an austenitic stainless steel or a nickel-base alloy.

The material forming the core internals are subjected to harsh environment and neutron irradiation, and thus deteriorate after long time use. Specifically, since the material near welded parts of the core internals is sensitized by welding heat and has tensile residual stress, there exists a risk of stress corrosion cracking. A shroud, which is one of main structures in a reactor vessel and is hardly exchange, has the above risk. Thus, the shroud, specifically welded parts thereof, must be inspected periodically and repaired according to the inspection result.

There have been proposed various systems for performing inspection and/or repair of a reactor vessel or core internals. Such a system is provided with a working tool, and is configured to freely move in waters or is configured to move in water while being flattened against a wall. In detail, a known system has a main body provided with an inspecting and/or repairing tool (hereinafter referred to as "work tool"). The main body is provided therein with a float so that the main body may be suspended in water in its vertical posture. The main body is further provided with a thrust fan and drive wheels. By operating the thrust fan, the main body approaches a vertical wall, and the drive wheels come into contact with the wall. Then, the drive wheels are driven to run on the wall, so that work tool attached to the main body of the system moves along the wall surface to reach a location to be inspected or repaired. Such a system is disclosed in Japanese Patent Laid-Open Publication JP09-58586A and JP2003-40194A, for example.

In the foregoing system whose main body is suspended in water in its vertical posture, the vertical position of the main body may possibly be dislocated due to its own weight or force acting on the main body through a cable connected thereto. Since the direction of the dislocation is perpendicular to the running direction of the main body (i.e., horizontal direction), it is difficult to correct the vertical position of the main body to its target position. That is, the work tool can not be moved along a path to be inspected and/or repaired.

SUMMARY OF THE INVENTION

The present invention has been made in view of the foregoing circumstances. It is therefore the object of the present invention to provide an underwater inspecting and repairing system that is capable of preventing vertical dislocation of the work tool.

In order to achieve the above objective, the present invention provides an inspecting and repairing system operable in water, comprising: an underwater vehicle including: a drive wheel adapted to engage with a vertical surface of an underwater structure to be inspected or repaired, and adapted to run on the vertical surface; a contact force generating unit adapted to generate a contact force allowing the drive wheel to be pressed against the vertical wall; an ascending force control unit adapted to control an ascending force acting on the underwater vehicle; and a guide roller, adapted to engage with an undersurface of the underwater structure, that is pressed against the undersurface of the underwater structure by an ascending force acting on the underwater vehicle and controlled by the ascending force control unit; and a work tool connected to the underwater vehicle and adapted to perform inspection or repair of the underwater structure.

In one preferred embodiment, the work tool is mounted to the underwater vehicle. In another preferred embodiment, the system further includes: a work tool carrier carrying the work tool and arranged separately from the underwater vehicle; and a cable connecting the work tool carrier to the underwater vehicle.

The above and other features and advantages of the present invention will be apparent from the following description with reference to the attached drawings.

DESCRIPTION OF PREFERRED EMBODIMENTS

Figure 1:
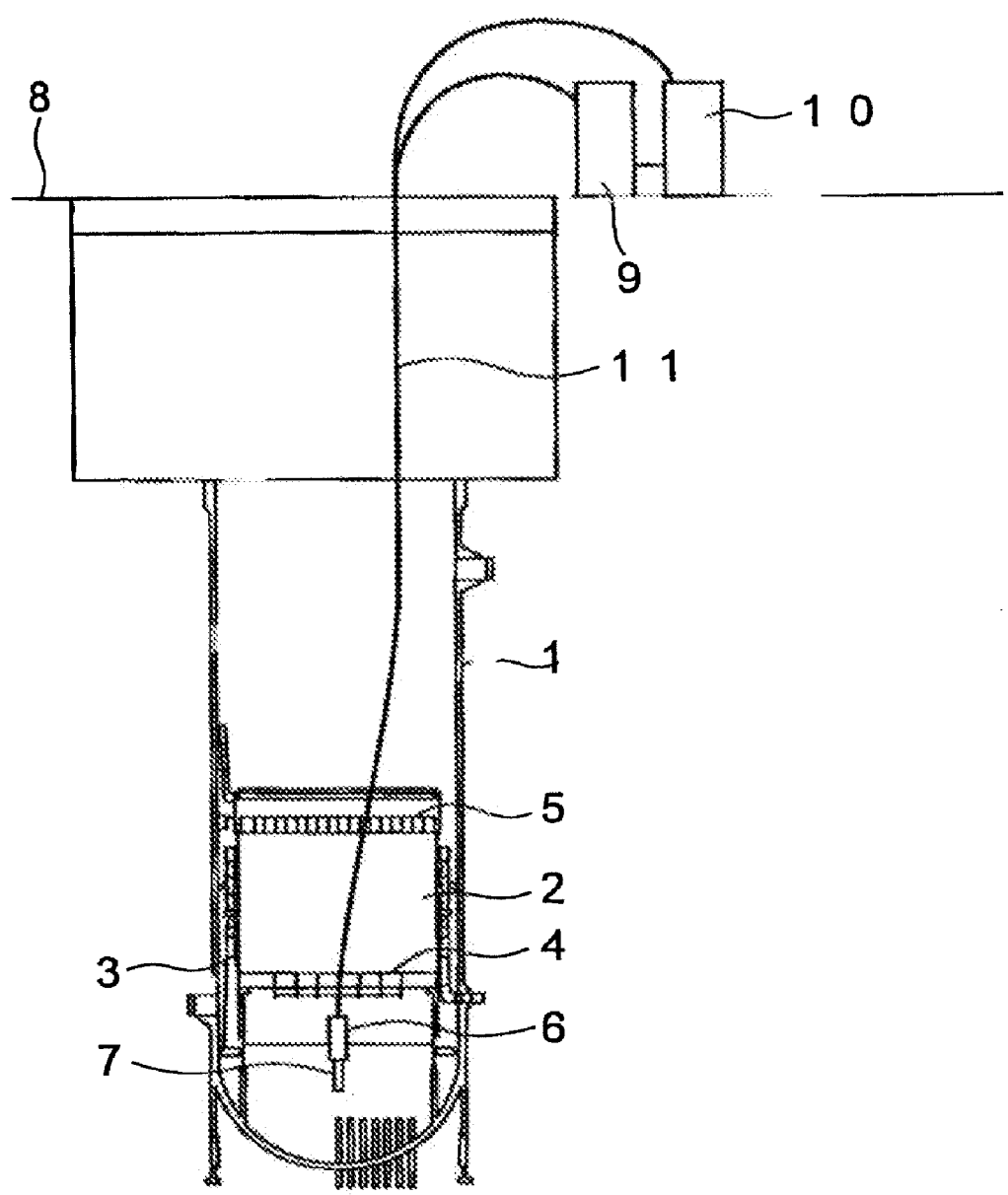
FIG. 1 Is a schematic vertical cross-sectional view of a pressure vessel in which an inspecting and repairing system according present invention is working.

Preferred embodiments of the present invention will be described with reference to the attached drawings. In the drawings, the same or essentially the same component parts are designated by the same reference signs. FIG. 1 schematically shows a reactor inspecting and repairing system (i.e., underwater inspecting and repairing system) that is working in a boiling-water reactor (BWR). A reactor pressure vessel (RPV) 1 is provided therein with a shroud 2, which is arranged coaxially with the RPV 1. Jet pumps 3 are circumferentially arranged in an annular gap defined between the RPV 1 and the shroud 2. A core support plate 4 is arranged in the shroud 2 at the bottom portion thereof. An upper grid plate 5 is arranged in the shroud 2 at the upper portion thereof to support the upper portion of a fuel assembly. Reference numeral 6 denotes underwater vehicle, to which a work tool 7 is connected. A control unit 9 and a processing unit 10, mounted on an operation floor 8 or a fuel handling machine, are connected through a composite cable 11 to the underwater vehicle 6. The composite cable 11 may include control signal lines, power lines, or fluid supply lines. The work tool 7 may be any suitable device adapted for visual test, ultrasonic test, eddy current test, ferrite check, laser ultrasonic test, brushing, cleaning, laser peening, water jet peening, shot peening, electrical discharge machining, laser welding, or machining.

Figure 2:
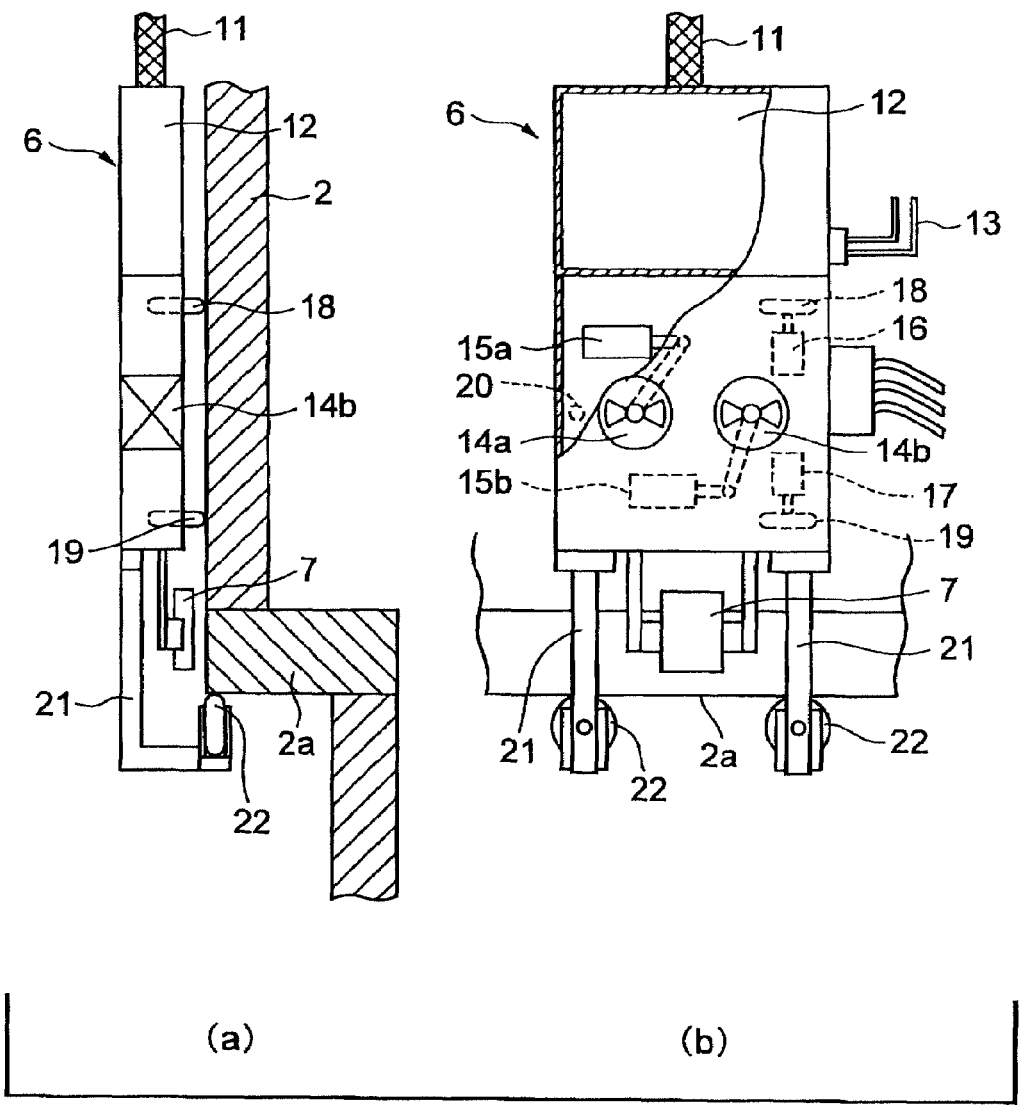
FIG. 2 shows a side view of and a back view of an underwater vehicle included in the inspecting and repairing system in a first embodiment of the present invention.

FIG. 2 shows the first embodiment of the underwater inspecting and repairing system according to the present invention. An underwater vehicle 6 has a casing, or a main body. A ballast (ballast tank) 12 is provided in the upper portion of the main body. Tubes 13 are connected to the ballast 12 to supply or discharge air or water to and from the ballast 12, so that the buoyancy, or the ascending force, acting on the underwater vehicle 6 submerged in water in its vertical posture can be adjusted.

Thrusters 14a and 14b are provided in the underwater vehicle 6. The underwater vehicle 6 can be moved horizontally by driving the thrusters 14a and 14b by means of drive motors 15a and 15b, respectively. That is, upon normal rotation or reverse rotation of the thrusters 14a and 14b, the underwater vehicle 6 suspended in water in its vertical posture can be moved toward the vertical wall of the shroud 2, or can be moved away from the vertical wall of the shroud 2. In addition, the underwater vehicle 6 can be turned by controlling the rotation speed of the drive motors 15a and 15b and thus controlling the rotation speed of the thrusters 14a and 14b independently.

Attached to the underwater vehicle 6 are drive wheels 18 and 19 and a ball caster 20, which are brought into contact with and pressed against the vertical wall of the shroud 2 when the thrusters 14a and 14b generate a thrust to move the underwater vehicle 6 toward the vertical wall of the shroud 2. Thus, the thrusters 14a and 14b can act as a contact force generating unit which generates contact force to allow the drive wheels 18 and 19 to be pressed against the vertical wall. The drive wheels 18 and 19 are driven by motors 16 and 17, so that the underwater vehicle 6 can move horizontally along the vertical wall.

Extending downward from the center portion of the lower end of the main body of the underwater vehicle 6 are brackets, to which a work tool 7 for inspection and/or repair is attached. L-shaped arms 21 extend downwardly from the right and left lower ends of the main body of the underwater vehicle 6. Each of the L-shaped arms 21 is provided at the tip thereof with a guide roller 22. The guide rollers 22 is arranged and configured such that they can be brought into contact with and roll on a lower surface 2a (undersurface) of a step formed in the shroud 2.

In operation, the underwater vehicle 6 holding the work tool 7 moves in water and reaches to a site to be inspected and/or repaired (hereinafter referred to as "inspection site"). When inspecting the lower body of the shroud 2 or the lower region of the reactor, the underwater vehicle 6 passes through the upper grid plate 5 and the core support plate 4 to reach the inspection site. When inspecting the outer surface of the shroud 2, the underwater vehicle 6 moves into the RPV 1 via the annulus, moves through the annular gap between the RPV 1 and the shroud 2 and passes through the space between the jet pumps 3, thereby to reach the inspection site. The underwater vehicle 6 shown in FIG. 2 is specifically configured to inspect the upper part of the shroud 2 and an outer area of the medium part of the shroud 2.

Water is supplied into the ballast 12 to control the buoyancy acting on the underwater vehicle 6 to descend the same to a position near the inspection site. When the underwater vehicle 6 reaches the inspection site, the thruster 14a and 14b are driven to move the underwater vehicle 6 to a position where the drive wheels 18 and 19 and the caster 20 come into contact with the vertical wall of the shroud 2. Then, air is supplied into the ballast 12 such that positive ascending force (i.e., buoyancy) acts on the whole underwater vehicle 6. Thereby, the guide rollers 22 come into contact with and are pressed against the lower surface 2a of the step, so that ascending movement, or vertical displacement, of the underwater vehicle 6 due to the buoyancy acting on the underwater vehicle 6 is prevented. Thus, the underwater vehicle 6 is appropriately positioned with respect to the vertical direction. In this state, the thrusters 14a and 14b are driven to press the drive wheels 18 and 19 and the caster 20 against the vertical wall of the shroud 2, and the drive wheels 18 and 19 are driven to allow the underwater vehicle 6 to run horizontally on the vertical wall of the shroud 2 to reach the inspection sites where inspection and/or repair is carried out by using the work tool 7.

In the foregoing embodiment, since the guide rollers 22 are engaged with the lower surface 2a of the step of the shroud 2 by the buoyancy acting on the underwater vehicle 6, vertical displacement of the underwater vehicle 6 when it is running on the shroud 2 can be prevented.

Figure 3:
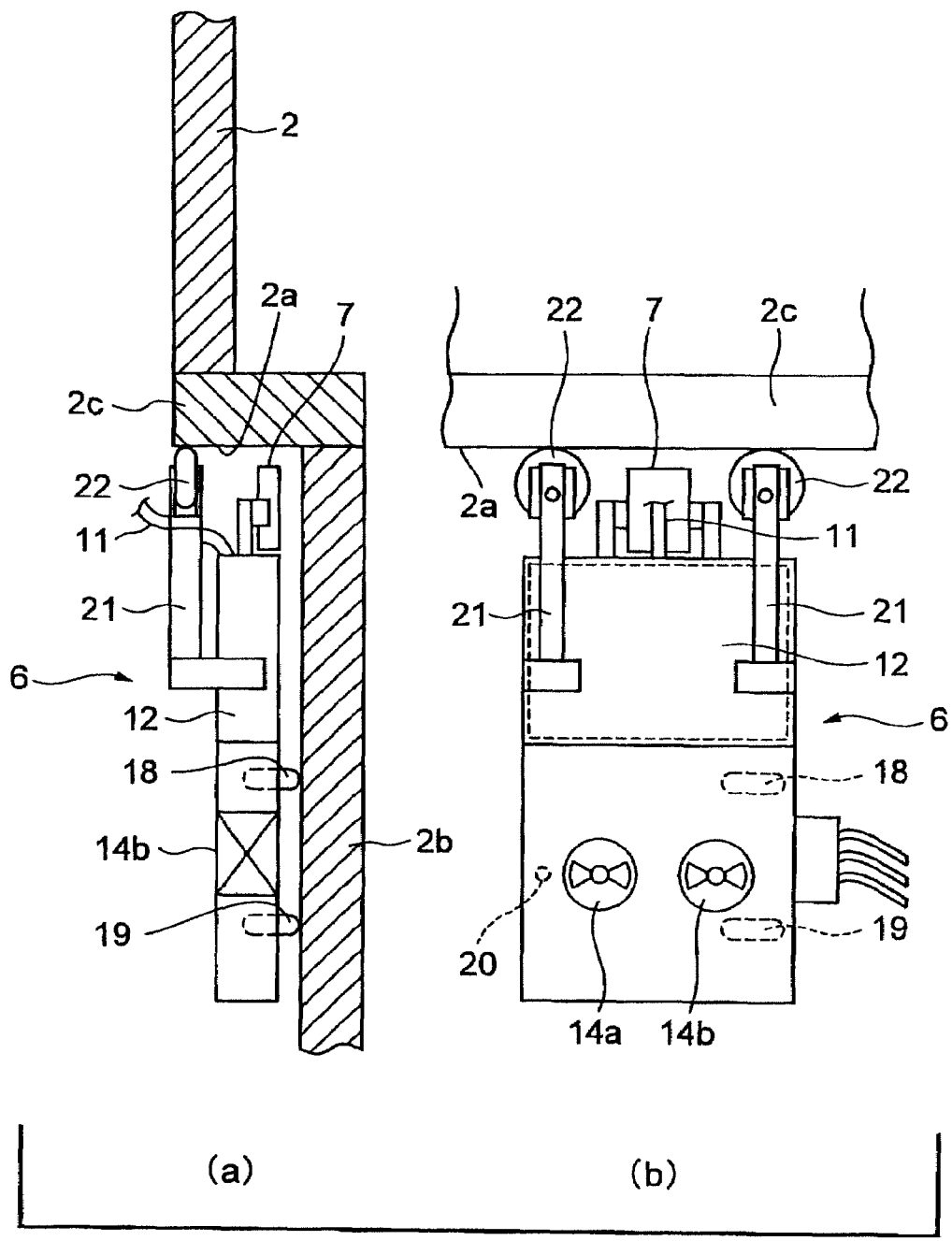
FIG. 3 shows a side view of and a back view of an underwater vehicle included in the inspecting and repairing system in a second embodiment of the present invention.

FIG. 3 shows the second embodiment of the present invention, in which the arrangement of work tool 7 and the guide rollers 22 is changed in order to facilitate inspection of inspection sites near the corner at the joint of the lower body 2b of the shroud 2 and a horizontal step 2c. In this embodiment, a work tool 7 is provided on the center upper portion of an underwater vehicle 6 via brackets; and the L-shaped arms 21 holding the guide rollers 22 extend upwardly from the right and left upper ends of the underwater vehicle 6. The guide rollers 22 can be brought into contact with and roll on a lower surface 2a of a step formed in the shroud 2. Also in this embodiment, since the guide rollers 22 are engaged with the lower surface 2a of the step of the shroud 2 by the buoyancy acting on the underwater vehicle 6, vertical displacement of the underwater vehicle 6 when it is running on the shroud 2 can be prevented.

Figure 4:
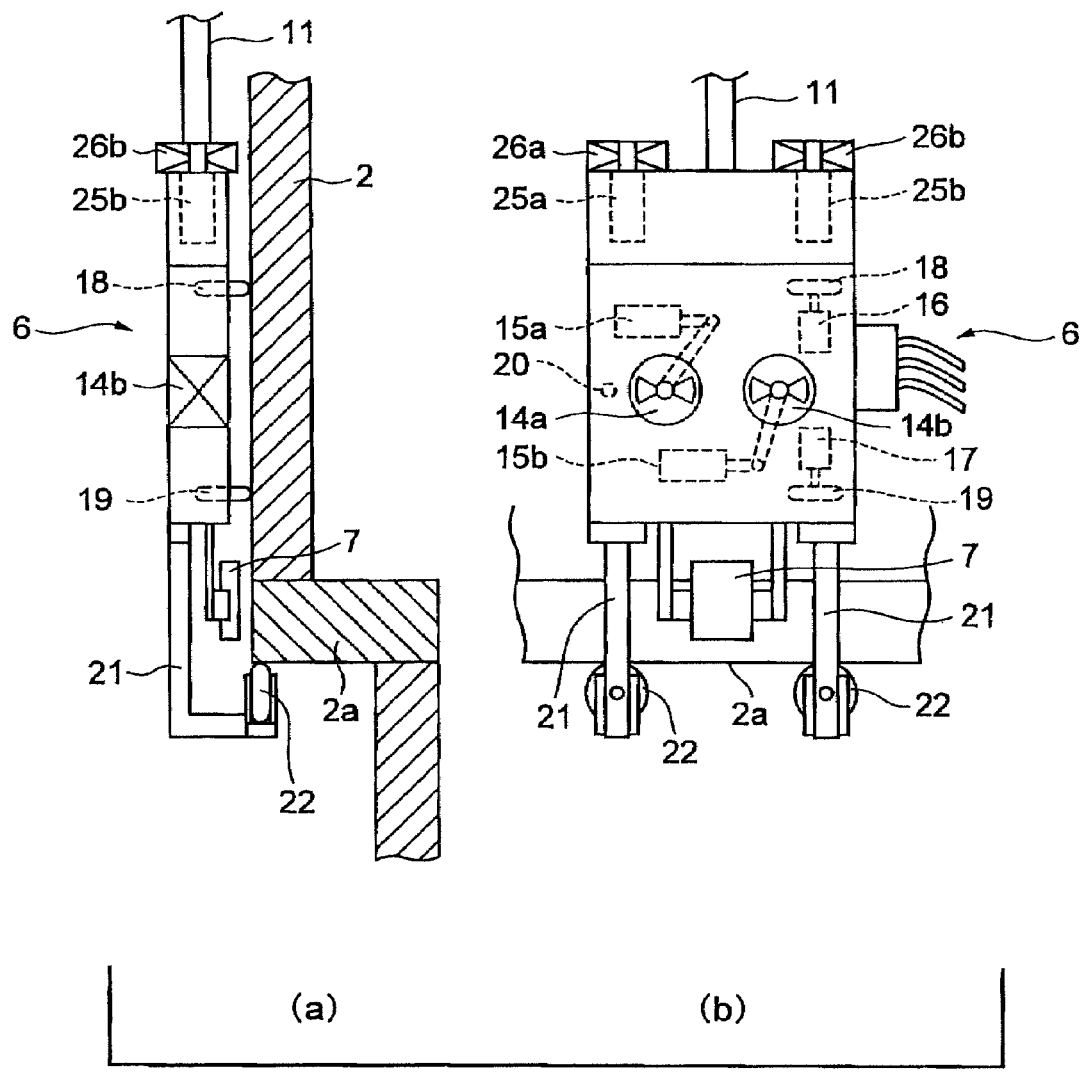
FIG. 4 shows a side view of and a back view of an underwater vehicle included in the inspecting and repairing system in a third embodiment of the present invention.

FIG. 4 shows the third embodiment of the present invention, in which fan or screw propellers 26a and 26b are provided for controlling the ascending force acting on the underwater vehicle 6, in place of the ballast 12 shown in FIGS. 2 and 3. In this embodiment, the fan propellers 26a and 26b are provided on right and left upper ends of the main body of the underwater vehicle 6. The fan propellers 26a and 26b are driven for rotation about vertical axes thereof by means of motors 25a and 25b, respectively. Preferably, the whole underwater vehicle 6 has a specific gravity (apparent specific gravity) equal to or less than that of water, more preferably, slightly less than that of water so that the underwater vehicle 6 floats in water when the fan propellers 26a and 26b are not rotated. To this end, a buoyancy material may be provided in the underwater vehicle 6.

In operation, the screw propellers 26a and 26b are driven for reverse rotation to generate descending force so that the underwater vehicle 6 descends in water to reach the inspection site. When the underwater vehicle 6 reaches the inspection site, the thrusters 14a and 14b are driven to move the underwater vehicle 6 to a position where the drive wheels 18 and 19 and the caster 20 come into contact with the vertical wall of the shroud 2. Then, the screw propellers 26a and 26b are driven for normal rotation so that ascending force acts on the underwater vehicle 6. Thereby, the guide rollers 22 come into contact with and are pressed against the lower surface 2a of the step, so that ascending movement, or vertical displacement, of the underwater vehicle 6 due to the ascending force acting on the underwater vehicle 6 is prevented. Thus, the underwater vehicle 6 is appropriately positioned with respect to the vertical direction. In this state, the thrusters 14a and 14b are driven to press the drive wheels 18 and 19 and the caster 20 against the vertical wall of the shroud 2, and the drive wheels 18 and 19 are driven to allow the underwater vehicle 6 to run horizontally on the vertical wall of the shroud 2 to reach the inspection site, where inspection and/or repair is carried out by using the work tool 7.

Figure 5:
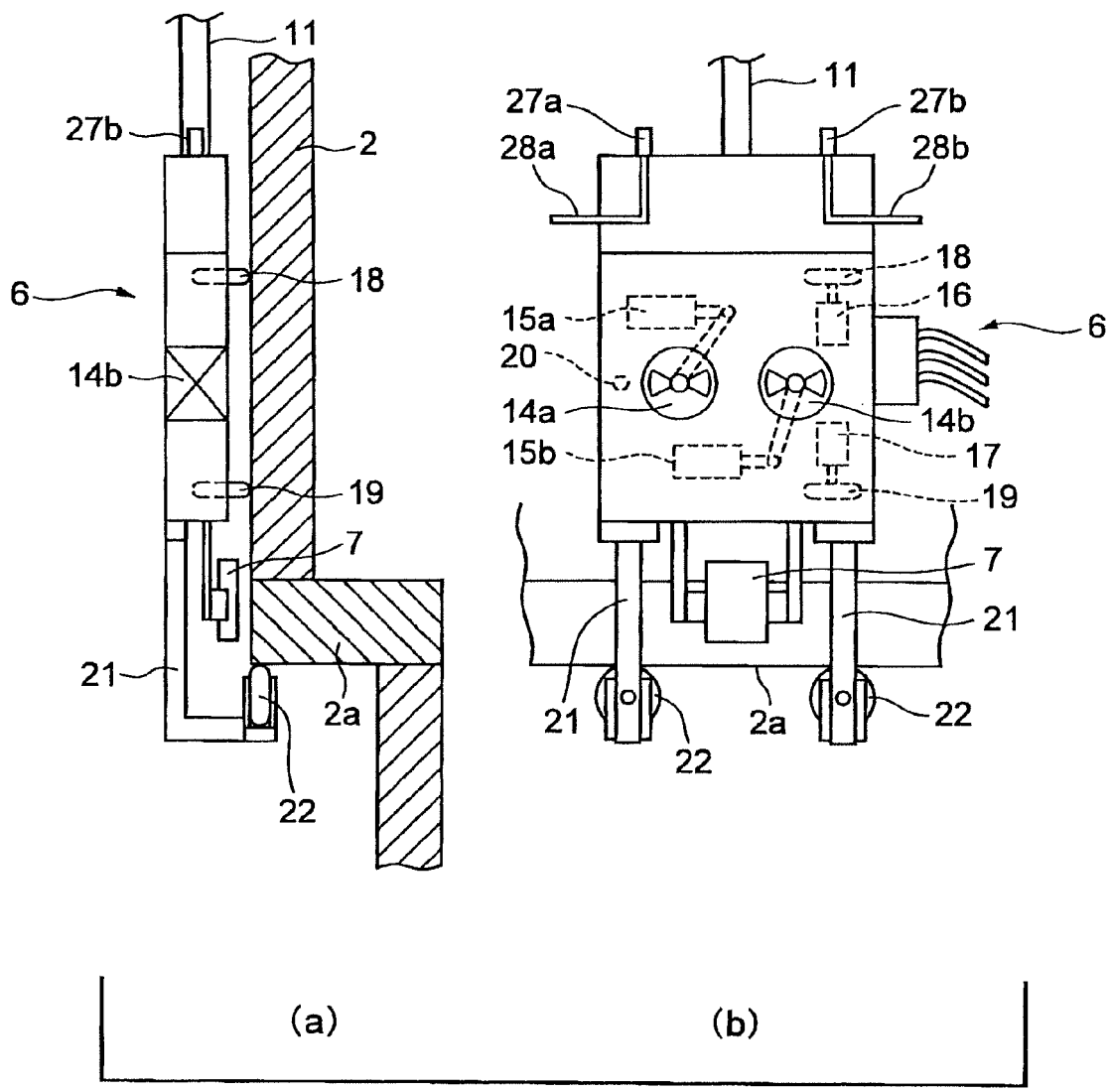
FIG. 5 shows a side view of and a back view of an underwater vehicle included in the inspecting and repairing system in a fourth embodiment of the present invention.

FIG. 5 shows the fourth embodiment of the present invention, in which a water jetting unit is provided for controlling the ascending force acting on the underwater vehicle 6, in place of the ballast 12 shown in FIGS. 2 and 3. The water jetting unit comprises water jetting nozzles 27a and 27b, which are arranged on right and left upper ends of the underwater vehicle 6, respectively. Pressurized water is supplied through hydraulic hoses 28a and 28b, and is jetted upwardly from the nozzles 27a and 27b, respectively, in order to generate descending force acting on the underwater vehicle 6. In this embodiment, the whole underwater vehicle 6 has a specific gravity (apparent specific gravity) less than that of water so that the underwater vehicle 6 floats in water when the water jetting nozzles 27a and 27b are not operated. In order to adjust the apparent specific gravity, a buoyancy material may be provided in the underwater vehicle 6. The power of the water jet counteracts the buoyancy, or the ascending force, acting on the underwater vehicle 6.

In operation, the underwater vehicle 6 is forcibly immersed under water by any suitable means such as a push rod, and then the water jetting nozzles 27a and 27b jet water upwardly so that the underwater vehicle 6 descends in water to reach the inspection site. When the underwater vehicle 6 reaches the inspection site, the thruster 14a and 14b are driven to move the underwater vehicle 6 to a position where the drive wheels 18 and 19 and the caster 20 come into contact with the vertical wall of the shroud 2. Then, the water jetting nozzles 27a and 27b stops jetting water so that the underwater vehicle 6 tends to move upward due to the ascending force, or the buoyancy, acting on the underwater vehicle 6. Thereby, the guide rollers 22 come into contact with and are pressed against the lower surface 2a of the step, so that ascending movement, or vertical displacement, of the underwater vehicle 6 due to the ascending force acting on the underwater vehicle 6 is prevented. Thus, the underwater vehicle 6 is appropriately positioned with respect to the vertical direction. In this state, the thrusters 14a and 14b are driven to press the drive wheels 18 and 19 and the caster 20 against the vertical wall of the shroud 2, and the drive wheels 18 and 19 are driven to allow the underwater vehicle 6 to run horizontally on the vertical wall of the shroud 2 to reach the inspection site, where inspection and/or repair is carried out by using the work tool 7.

Figure 6:
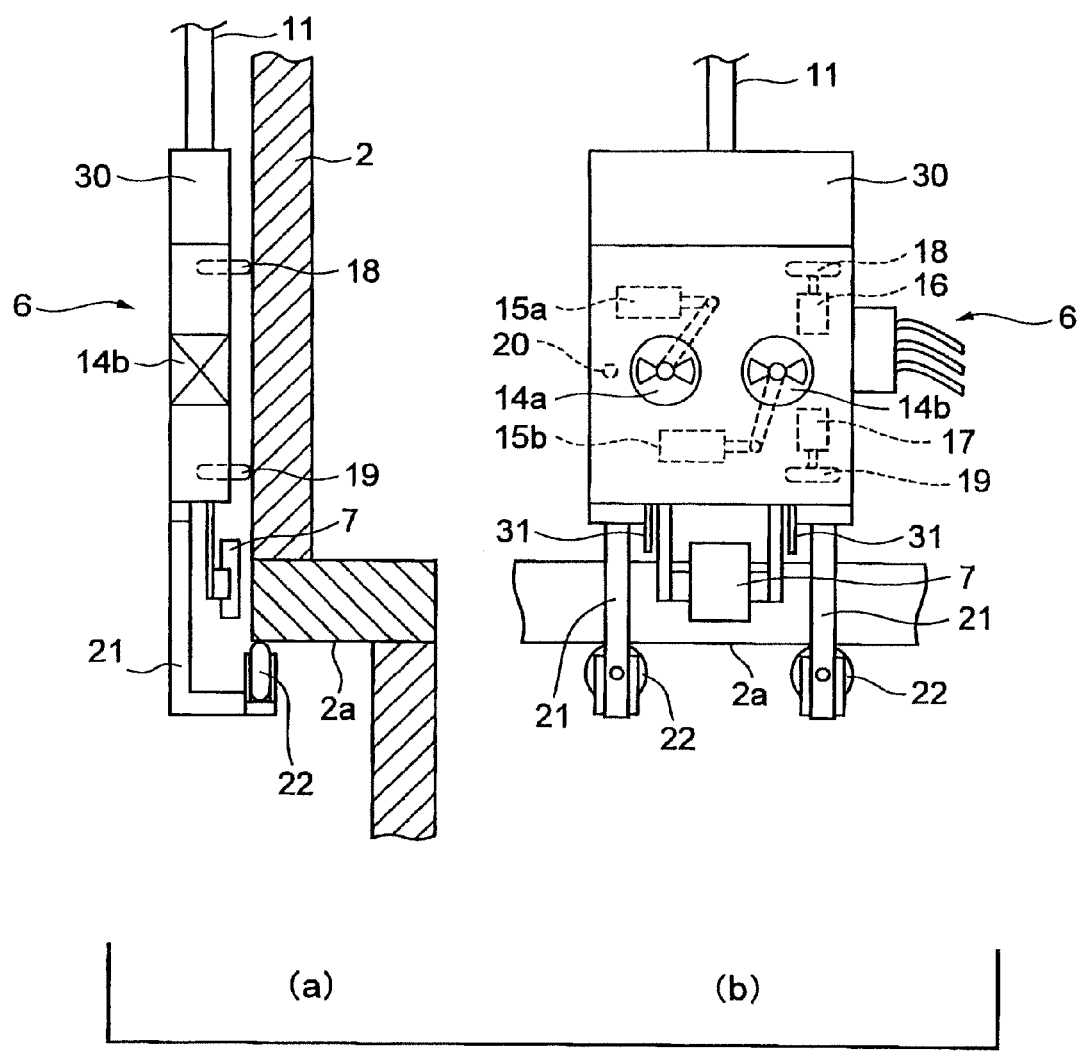
FIG. 6 shows a side view of and a back view of an underwater vehicle included in the inspecting and repairing system in a fifth embodiment of the present invention.

FIG. 6 shows the fifth embodiment of the present invention, in which at least one removable weight is provided for controlling the ascending force acting on the underwater vehicle 6, in place of the ballast 12 shown in FIGS. 2 and 3. In this embodiment, the underwater vehicle 6 is provided with two weights 31 detachably attached to right and left lower portions of the underwater vehicle 6. A wire (not shown) is connected to each of the weights 31. In this embodiment, the whole underwater vehicle 6 with weights 31 has a specific gravity (apparent specific gravity) greater than that of water so that the underwater vehicle 6 sinks in water, while the whole underwater vehicle 6 without weights 31 has a specific gravity (apparent specific gravity) less than that of water so that the underwater vehicle 6 floats in water. In order to adjust the apparent specific gravity of the underwater vehicle 6 without weights 31, a floating buoyant material 30 is attached to the upper portion of the main body of the underwater vehicle 6.

In operation, the underwater vehicle 6 with weights 31 is submerged in water to reach the inspection site. When the underwater vehicle 6 reaches the inspection site, the thruster 14a and 14b are driven to move the underwater vehicle 6 to a position where the drive wheels 18 and 19 and the caster 20 come into contact with the vertical wall of the shroud 2. Then, the weights 31 are separated from the main body of the underwater vehicle 6 by means of a releasing mechanism (not shown) provided in the underwater vehicle 6, so that the underwater vehicle 6 tends to move upward due to the ascending force, or the buoyancy, acting on the underwater vehicle 6. Thereby, the guide rollers 22 come into contact with and are pressed against the lower surface 2a of the step, so that ascending movement, or vertical displacement, of the underwater vehicle 6 due to the ascending force acting on the underwater vehicle 6 is prevented. Thus, the underwater vehicle 6 is appropriately positioned with respect to the vertical direction. In this state, the thrusters 14a and 14b are driven to press the drive wheels 18 and 19 and the caster 20 against the vertical wall of the shroud 2, and the drive wheels 18 and 19 are driven to allow the underwater vehicle 6 to run horizontally on the vertical wall of the shroud 2 to reach the inspection site, where inspection and/or repair is carried out by using the work tool 7. Note that the separated weights 31 are hoisted up by using the not shown wires connected to the weights 31.

Figure 7:
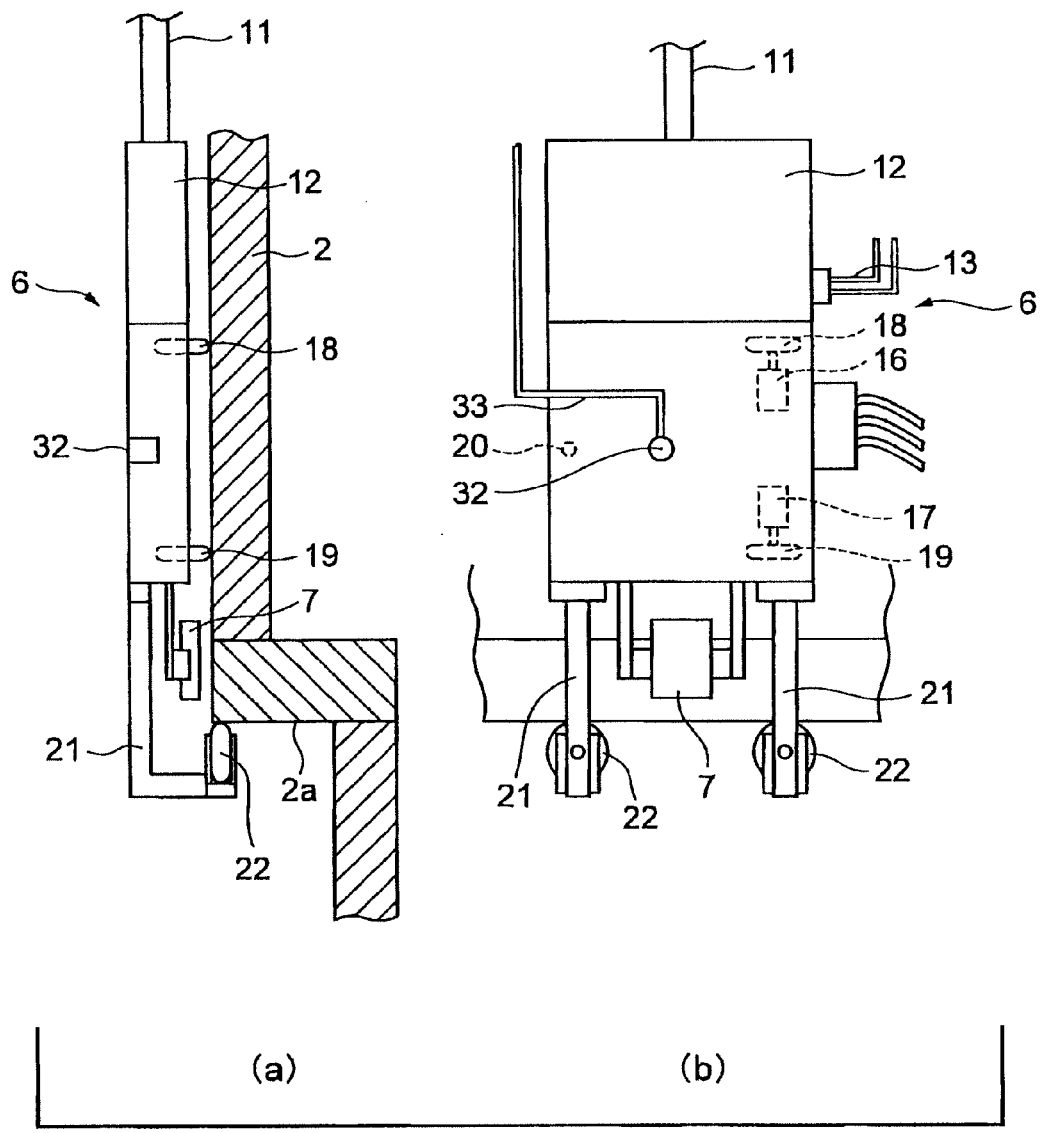
FIG. 7 shows a side view of and a back view of an underwater vehicle included in the inspecting and repairing system in a sixth embodiment of the present invention.

FIG. 7 shows the sixth embodiment of the present invention, in which a water jetting unit is substituted for the thrusters 14a and 14b shown in FIGS. 2 to 6. The water jetting unit includes a water jetting nozzle 32. Pressurized water is supplied through hydraulic hose 33 and is jetted horizontally from the nozzle 32, in order to move the underwater vehicle 6 to a position where the drive wheels 18 and 19 and the caster 20 come into contact with the vertical wall of the shroud 2, and in order to press the drive wheels 18 and 19 and the caster 20 against the vertical wall of the shroud 2. The system of FIG. 7 operates essentially in the same manner as that of FIG. 2, except for the difference in operation between the water jetting nozzle 32 and the thrusters 14a and 14b.

Figure 8:
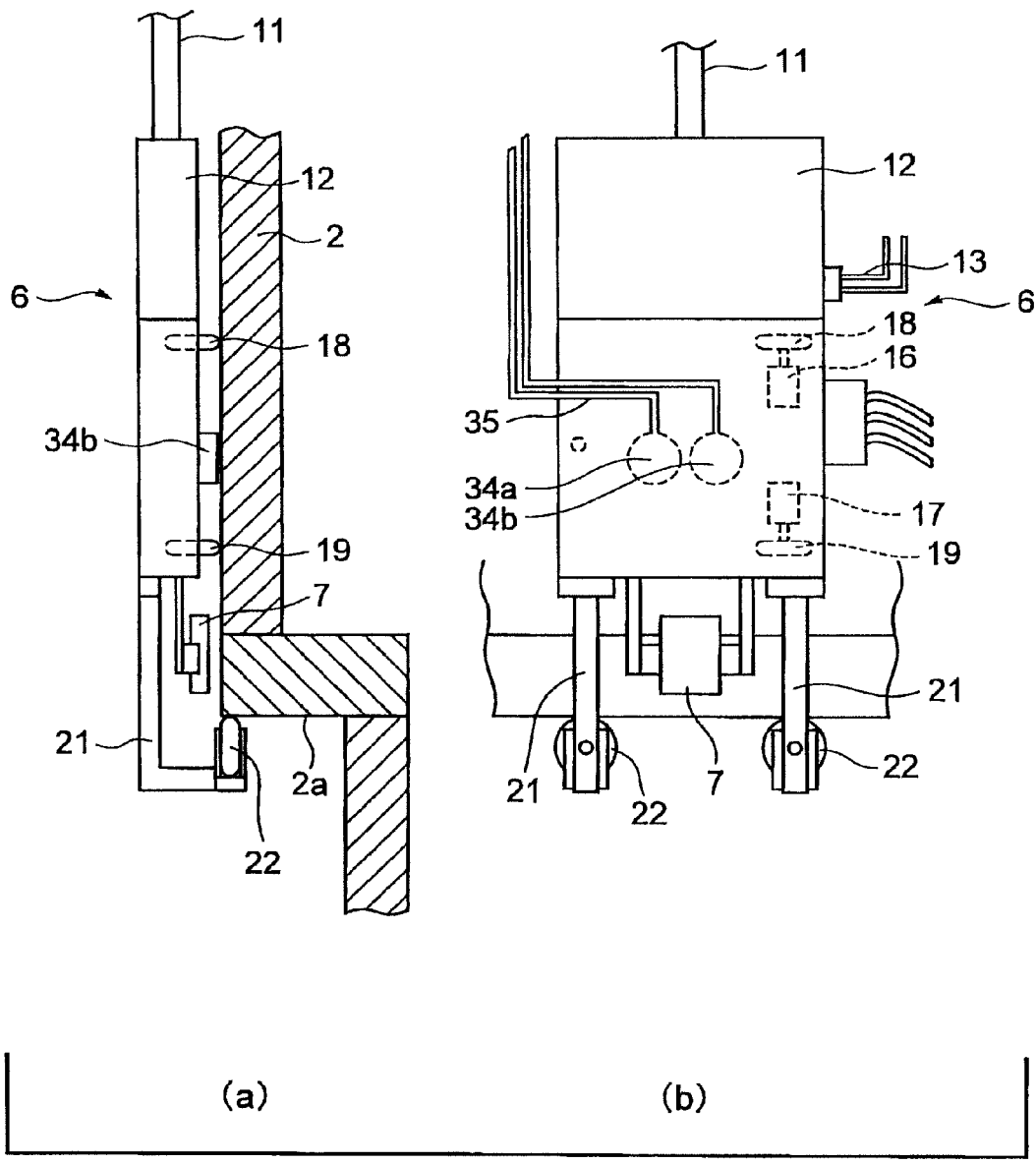
FIG. 8 shows a side view of and a back view of an underwater vehicle included in the inspecting and repairing system in a seventh embodiment of the present invention.

FIG. 8 shows the seventh embodiment of the present invention, in which suction pads 34a and 34b are substituted for the thrusters 14a and 14b shown in FIGS. 2 to 6. The suction pads 34a and 34b are disposed on a side, facing the vertical wall of the shroud 2, of the main body of the underwater vehicle 6. Suction hose 35 is connected to each of the suction pads 34a and 34b to suction the inner space of the suction pads 34a and 34b.

In operation, water is supplied into the ballast 12 to control the buoyancy acting on the underwater vehicle 6 to descend the same to a position near the inspection site. When the underwater vehicle 6 reaches the inspection site, any suitable device such as a bar (not shown) pushes the underwater vehicle 6 toward a position where not only the drive wheels 18 and 19 and the caster 20 but also the suction pads 34a and 34b come into contact with the vertical wall of the shroud 2. Then, air is supplied into the ballast 12 such that positive ascending force (i.e., buoyancy) acts on the whole underwater vehicle 6. Thereby, the guide rollers 22 come into contact with and are pressed against the lower surface 2a of the step, so that ascending movement, or vertical displacement, of the underwater vehicle 6 due to the buoyancy acting on the underwater vehicle 6 is prevented. Thus, the underwater vehicle 6 is appropriately positioned with respect to the vertical direction. In this state, suction pads 34a and 34b are suctioned through the suction hoses to press the drive wheels 18 and 19 and the caster 20 against the vertical wall of the shroud 2, and the drive wheels 18 and 19 are driven to allow the underwater vehicle 6 to run horizontally on the vertical wall of the shroud 2 to reach the inspection site, where inspection and/or repair is carried out by using the work tool 7. Note that the suction force applied to the suction pads 34a and 34b is controlled such that the underwater vehicle 6 can move horizontally along the vertical walls but the suction pads 34a and 34b are not separated from the vertical wall.

Figure 9:
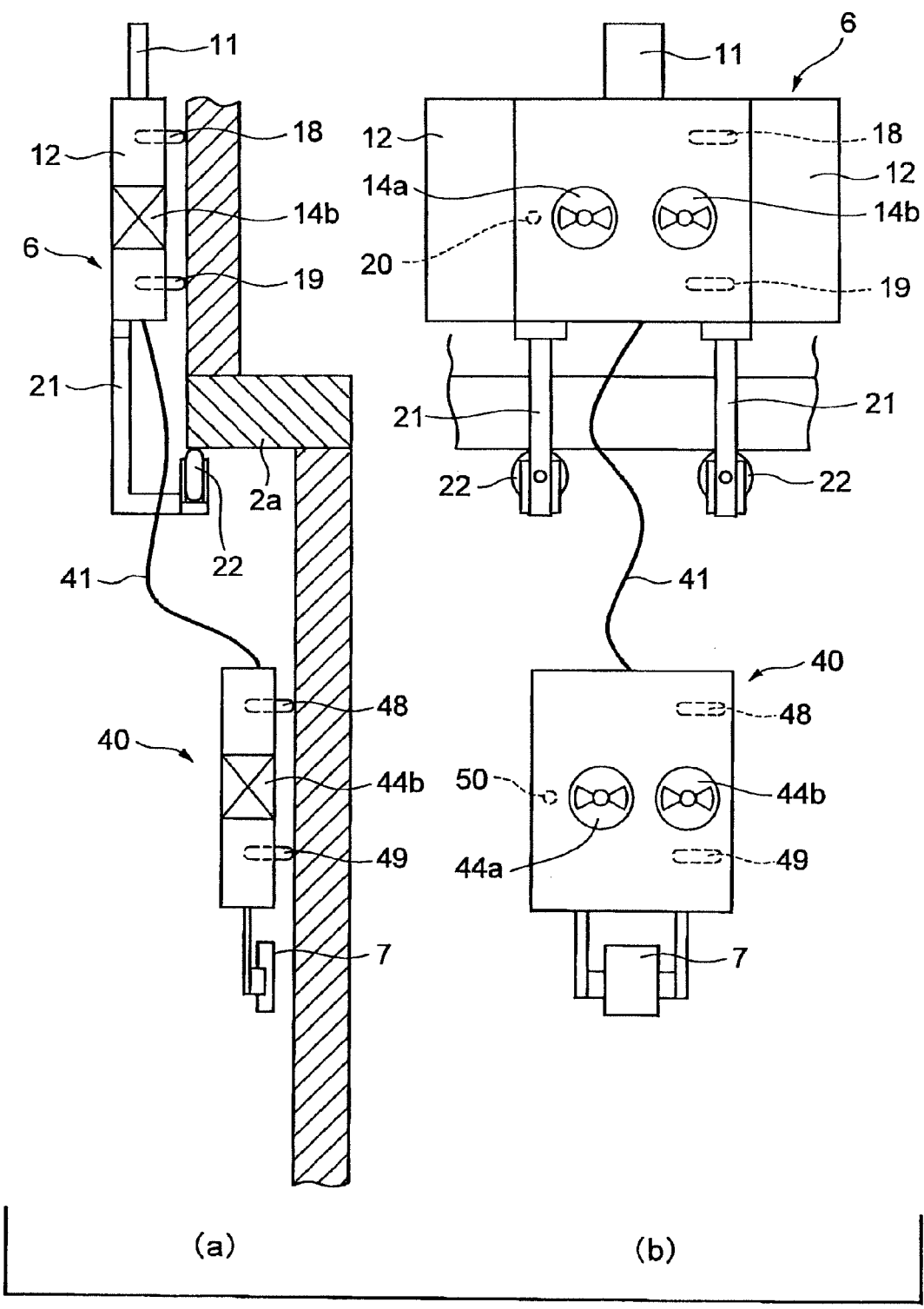
FIG. 9 shows a side view of and a back view of an underwater vehicle and a work tool carrier included in the inspecting and repairing system in an eighth embodiment of the present invention.

FIG. 9 shows the eighth embodiment of the present invention. In this embodiment, the work tool 7 is not mounted to the underwater vehicle 6 but is mounted to a work tool carrier 40, or a sub vehicle. The work tool carrier 40 is a unit separated from the underwater vehicle 6, and is connected to the underwater vehicle 6, or a main vehicle, through a cable 41. The cable 41 may include control signal lines, power lines, or fluid supply lines. The work tool carrier 40 has a casing, or a main body, to which thrusters 44a and 44b and drive wheels 48 and 49 and a caster 50, which have essentially the same structures and functions as those of the thrusters 14a and 14b and the drive wheels 18 and 19 and the caster 20, respectively. The underwater vehicle 6 of FIG. 9 has a pair of ballasts 12 at the right and left portion of the main body. This arrangement facilitates precise posture control of the underwater vehicle 6.

In operation, water is supplied into the ballast 12 to control the buoyancy acting on a system including the underwater vehicle 6 and the work tool carrier 40 to descend the same to positions near the inspection site. When the underwater vehicle 6 reaches to a position near the lower surface 2a of the step of the shroud 2, the thruster 14a and 14b are driven to move the underwater vehicle 6 to a position where the drive wheels 18 and 19 and the caster 20 come into contact with the vertical wall of the shroud 2. Then, air is supplied into the ballast 12 such that positive ascending force (i.e., buoyancy) acts on the whole underwater vehicle 6. Thereby, the guide rollers 22 come into contact with and are pressed against the lower surface 2a of the step, so that ascending movement, or vertical displacement, of the underwater vehicle 6 due to the buoyancy acting on the underwater vehicle 6 is prevented. Thus, the underwater vehicle 6 is appropriately positioned with respect to the vertical direction. In this state, the thrusters 14a and 14b of the underwater vehicle 6 are driven to press the drive wheels 18 and 19 and the caster 20 against the vertical wall of the shroud 2, and the drive wheels 18 and 19 are driven to allow the underwater vehicle 6 to run horizontally on the vertical wall of the shroud 2. In addition thrusters 44a and 44b of the work tool carrier 40 are driven to press the drive wheels 48 and 49 and the caster 40 against the vertical wall of the shroud 2, and the drive wheels 48 and 49 are driven to allow the work tool carrier 40 to run horizontally on the vertical wall of the shroud 2 and to follow the horizontal movement of the underwater vehicle 6, so that the work tool carrier 40 reaches the inspection site where inspection and/or repair is carried out by using the work tool 7 mounted to the work tool carrier 40.

In this embodiment, the effect of the own weight of the composite cable 11 and any disturbance affecting on the composite cable 11 are absorbed by the underwater vehicle 6 and are not transmitted to the work tool carrier 40. Only the own weight the cable 41 affects on the work tool carrier 40. Thus, the work tool carrier 40 holding the work tool 7 can stably travel on the vertical wall of the shroud 2 together with the underwater vehicle 6, and can be positioned accurately.

The present invention is not limited to the forgoing embodiments. For example, the underwater vehicle of FIG. 9 may be replaced with the underwater vehicle of FIG. 3 having the guide rollers at the upper portion thereof. The underwater vehicle of FIG. 9 may be replaced with any one of the underwater vehicles of FIGS. 2 to 8. The underwater vehicle may be further provided with additional propellers or posture control device. The main features of the respective embodiments may be combined.

This application claims priority from Japanese Patent Application 2006-035209, filed Feb. 13, 2006, which is incorporated herein by reference in its entirety.

The invention claimed is:

1. An inspecting and repairing system operable in water, comprising:
an underwater vehicle including:
a drive wheel adapted to engage with a vertical surface of an underwater structure to be inspected or repaired, and adapted to run on the vertical surface;
a contact force generating unit adapted to generate a contact force allowing the drive wheel to be pressed against the vertical wall;
an ascending force control unit adapted to control an ascending force acting on the underwater vehicle; and
a guide roller, adapted to engage with an undersurface of the underwater structure, that is pressed against the undersurface of the underwater structure by an ascending force acting on the underwater vehicle and controlled by the ascending force control unit; and
a work tool connected to the underwater vehicle and adapted to perform inspection or repair of the underwater structure.

2. The inspecting and repairing system according to claim 1, wherein the work tool is mounted to the underwater vehicle.

3. The inspecting and repairing system according to claim 1, further comprising:
a work tool carrier carrying the work tool and arranged separately from the underwater vehicle; and
a cable connecting the work tool carrier to the underwater vehicle.

4. The inspecting and repairing system according to claim 3, wherein the work tool carrier includes:
a carrier drive wheel adapted to engage with a vertical surface of an underwater structure to be inspected or repaired, and adapted to run on the vertical surface; and
a carrier contact force generating unit adapted to generate a contact force allowing the drive wheel to be pressed against the vertical wall.

5. The inspecting and repairing system according to claim 1, the ascending force control unit includes a ballast, wherein water may be supplied and discharged into and from the ballast to control a buoyancy, as the ascending force, of the underwater vehicle.

6. The inspecting and repairing system according to claim 1, the ascending force control unit includes a propeller adapted to generate a vertical propulsive force.

7. The inspecting and repairing system according to claim 6, the propeller comprises a fan propeller, a screw propeller, or a water jetting unit.

8. The inspecting and repairing system according to claim 1, the ascending force control unit includes a weight detachably attached to the underwater vehicle.

9. The inspecting and repairing system according to claim 1, the contact force generating unit includes a thruster adapted to generate a horizontal propulsive force.

10. The inspecting and repairing system according to claim 9, the thruster comprises a fan propeller, a screw propeller, or a water jetting unit.

11. The inspecting and repairing system according to claim 9, the contact force generating unit includes a suction pad which is to be adhered to the vertical surface by suction.

12. The inspecting and repairing system according to claim 1, the guide roller is disposed at an upper portion of the underwater vehicle.

13. The inspecting and repairing system according to claim 1, the guide roller is disposed at a lower portion of the underwater vehicle.

14. The inspecting and repairing system according to claim 1, the work tool is adapted for visual test, ultrasonic test, eddy current test, ferrite check, laser ultrasonic test, brushing, cleaning, laser peening, water jet peening, shot peening, electrical discharge machining, laser welding, or machining.

* * * * *